US010323865B2

(12) United States Patent
Cui et al.

(10) Patent No.: US 10,323,865 B2
(45) Date of Patent: Jun. 18, 2019

(54) COMPACT THERMOELASTIC COOLING SYSTEM

(71) Applicants: Jun Cui, Ames, IA (US); Ichiro Takeuchi, Laurel, MD (US)

(72) Inventors: Jun Cui, Ames, IA (US); Ichiro Takeuchi, Laurel, MD (US)

(*) Notice: Subject to any disclaimer, the term of this patent is extended or adjusted under 35 U.S.C. 154(b) by 79 days.

(21) Appl. No.: 15/348,874

(22) Filed: Nov. 10, 2016

(65) Prior Publication Data
US 2017/0138648 A1    May 18, 2017

Related U.S. Application Data

(60) Provisional application No. 62/254,526, filed on Nov. 12, 2015.

(51) Int. Cl.
| F25B 23/00 | (2006.01) |
| C09K 5/14 | (2006.01) |
| F28D 17/00 | (2006.01) |
| C09K 5/10 | (2006.01) |
| F28D 19/00 | (2006.01) |

(52) U.S. Cl.
CPC ............... F25B 23/00 (2013.01); C09K 5/10 (2013.01); C09K 5/14 (2013.01); F28D 17/00 (2013.01); F28D 19/00 (2013.01)

(58) Field of Classification Search
CPC .. C09K 5/14; C09K 5/10; F28D 17/00; F28D 19/00; F25B 23/00
See application file for complete search history.

(56) References Cited

U.S. PATENT DOCUMENTS

| 5,339,653 | A | * | 8/1994 | DeGregoria | ........... | A62B 9/003 165/10 |
| 6,367,281 | B1 | | 4/2002 | Hugenroth | | |
| 6,955,215 | B2 | * | 10/2005 | Al-Garni | ................. | F28D 21/00 165/185 |
| 7,748,641 | B2 | * | 7/2010 | Sudoh | ................ | B60H 1/00671 236/101 E |

(Continued)

OTHER PUBLICATIONS

Kuffman et al., "The Story of Nitinol: The Serendipitous Discovery of the Memory Metal and Its Applications", The Chemical Educator, 1997, vol. 2, No. 2, pp. 1-21.

(Continued)

Primary Examiner — Filip Zec
(74) Attorney, Agent, or Firm — Chen Yoshimura LLP

(57) ABSTRACT

A compact cooling system based on thermoelastic effect is provided. In one embodiment, the system comprises a pair of rollers serving as a heat sink, stress applicator and belt drive, a cold reservoir and a solid refrigerant belt coupled to the cold reservoir and to the heat sinks to pump heat from the cold reservoir to the heat sink. The refrigerant belt comprises solid thermoelastic materials capable of thermoelastic effect. The refrigerant material is mechanically compressed when entering the gap of the roller and subsequently released after passing through. When compressed the refrigerant material transforms to martensite phase and releases heat to the roller and neighboring materials. After released by the rollers, the refrigerant material transforms back to austenite and absorbs heat from the ambient atmosphere.

20 Claims, 6 Drawing Sheets

(56) References Cited

U.S. PATENT DOCUMENTS

| | | | | |
|---|---|---|---|---|
| 8,511,082 B2* | 8/2013 | Browne | ............... | F03G 7/065 |
| | | | | 60/527 |
| 2012/0273158 A1* | 11/2012 | Cui | ............... | C09K 5/14 |
| | | | | 165/10 |
| 2012/0294659 A1* | 11/2012 | Lee | ............... | G03G 15/2057 |
| | | | | 399/329 |
| 2015/0362202 A1* | 12/2015 | Ikegami | ............... | F24F 3/147 |
| | | | | 62/3.3 |
| 2015/0369524 A1* | 12/2015 | Ikegami | ............... | F25B 23/00 |
| | | | | 165/61 |
| 2016/0084544 A1* | 3/2016 | Radermacher | ............... | C09K 5/10 |
| | | | | 165/10 |
| 2016/0122611 A1* | 5/2016 | Yoshida | ............... | C08K 3/04 |
| | | | | 252/75 |
| 2017/0115075 A1* | 4/2017 | Hirata | ............... | F28F 13/18 |

OTHER PUBLICATIONS

Shaw et al., "Tips and Tricks for Characterizing Shape Memory Alloy Wire: Part 1—Differential Scanning Calorimetry and Basic Phenomena", Experimental Techniques, Sep./Oct. 2008, pp. 55-62.

* cited by examiner

COMPACT THERMOELASTIC COOLING SYSTEM

GOVERNMENT SUPPORT

This invention was made with government support under DE-EE0007043 awarded by Department of Energy. The government has certain rights in the invention.

BACKGROUND

The invention relates to systems and materials used for solid-state thermodynamic heat pump cycles or refrigeration cycles. More particularly, the invention relates to solid-state thermodynamic heat pump cycles or refrigeration cycles based on thermoelastic effect.

Thermoelastic cooling technology based on thermoelastic effect is known in the art. It is often referred to as elasto-caloric effect when the underlying science is discussed, and referred to as thermoelastic effect when the engineering and application aspects are discussed. Similar to the vapor compression cooling technology, the thermoelastic method relies on latent heat released or absorbed during the stress induced solid-to-solid phase transition. Tests of the thermoelastic refrigerant have demonstrated cooling efficiency as high as 11.8. Low cost and the high manufacturability of this technology have the potential to transform refrigeration industry and deliver significant impact to both energy efficiency and the environment. The present invention addresses the system designs, specifically, how to effectively use the working materials (refrigerants) in order to maximize system efficiency, system fatigue life, and cost effectiveness.

Compare to other alternative refrigeration technologies such as magnetocaloric, thermal-electric, thermal-acoustic, electro-caloric, only magnetocaloric and thermoelastic methods show significant impact on energy efficiency and the environment. Of the two methods, the thermoelastic cooling promises to be more cost effective because it does not involve any expensive magnetic field or critical rare earth materials.

Thermoelastic cooling effect is directly related to the reversible solid-to-solid martensitic phase transformation. In many ways, this concept is analogous to the conventional vapor compression technology because both use stress to induce phase transformations, and both utilize latent heat to achieve cooling. The difference lies in the form of the refrigerant. It is liquid/vapor for vapor compression, and solid/solid for thermoelastic cooling.

The reversible martensitic phase transformation is a diffusionless solid-to-solid transformation and involves crystallographic shearing deformation. The high-temperature phase (austenite) has higher symmetry than the low-temperature phase (martensite). The decrease of symmetry during the transformation results in the formation of multiple variants each with its own associated shape change. When the material is cooled to transform, all of the variants are equally likely to form. The randomly distributed variants leave the material with little change of its overall shape. When a stress is applied to this mixture of variants, certain variants will be energetically favored and appear in larger amounts than the others. The result is a significant change in shape as high as 10%. When the deformed martensite is warmed, the material transforms back to its austenitic configuration, which also restores the original shape of the alloy, acting as if it has a memory, thus the name of shape memory alloy (SMA).

In addition to temperature, a martensitic transformation can also be induced directly by stress. FIG. 1 depicts the process of stress-induced martensitic phase transformation in a CuAlNi alloy. At temperatures above the phase transformation, the material is in its austenite state (A), the stress-strain curve is steep, reflecting relatively high elastic constants. When the stress reaches certain magnitude, a martensite (M) starts to appear, and the material becomes soft. At this point, a small increase of the stress results in a large amount of deformation (strain). The material remains soft until most austenite is transformed; then the material starts to recover its rigidity, and the stress-strain curve becomes steep again. The large deformation with a small increase of stress is known as super-elasticity. The modern self-expanding stenting technology is based on super-elasticity.

Currently, the most widely used shape memory alloy is Nitinol (Nickel Titanium Navy Ordnance Laboratory). It is a binary alloy serendipitously discovered in 1961 (see Document No. 1), and later understood through the dedicated work of F. E. Wang. Nitinol's austenite phase has an ordered cubic (B2) crystal structure; its martensite has an ordered monoclinic (B19') crystal structure; and it has another intermediate rhombohedral phase (B2') often referred to as the R phase. The latent heat of each transformation is shown in FIG. 2 (see Document No. 2).

In addition to the shape memory alloys, there exist thermoelastic polymers that are capable of transforming from one solid phase to other solid phase, absorbing or releasing latent heat during the phase transformation. The transformation may be induced by temperature, stress, magnetic field, electric field, light, solution, or other forms of energy input. Example of the thermoelastic polymer include, but are not limited to, polyurethanes, polyurethanes with ionic or mesogenic components made by prepolymer method, block copolymer of polyethylene terephthalate (PET) and polyethyleneoxide (PEO), block copolymers containing polystyrene and poly(1,4-butadiene), and an ABA triblock copolymer made from poly(2-methyl-2-oxazoline) and polytetrahydrofuran. Compared to thermoelastic metals as refrigerant, thermoelastic polymer might be more cost effective, has longer service life, and requires less critical stress; however, it has a smaller thermal conductivity and a less power density.

The thermoelastic effect is a known effect that had been studied for several decades. While most of the efforts have been focused on the applications in the field of sensing and actuation, the potential of using the thermoelastic effect for cooling or refrigeration has only been explored spottily. For example, U.S. Pat. No. 6,367,281 describes the concept of thermoelastic cooling relatively adequately and attempts to disclose a refrigeration systems based on the thermoelastic effect (see Document No. 3). To the best of the present inventor's knowledge, this patent is the only instance where the concept of thermoelastic cooling was discussed. However, the embodiments disclosed in U.S. Pat. No. 6,367,281 are based on using tensile or torsional stress to induce the phase transformation. Since the working materials have a limited fatigue life under these two types of stress (<100,000 cycles when strain is >2%), any systems constructed based on these embodiments will have a limited service life and require undesirably high costs. In comparison, a system using compressive stress has much improved fatigue life. The fundamental reason for this difference is that micro-cracks existing in the materials will propagate with tensile or torsional stress, but they will heal with compressive stress.

An innovative system design utilizing compressive stress while maintaining effective heat exchange is needed.

The typical stress required to induce the phase transformation under compression is greater than 200 MPa and can be as high as 900 MPa. Applying such a large stress requires a rigid frame and a powerful loading cell. Cost-effectively applying compressive stress with a small footprint is one of the challenges for commercializing the thermoelastic cooling technology.

LIST OF DOCUMENTS

No. 1: G. B. Kauffman and I. Mayo, Chemical Educator, vol. 2, no. 2, 1997, p. 1-21.
No. 2: J. A. Shaw, C. B. Churchill and M. A. Iadicola, Experimental Techniques, 2008, September/October, pp. 55-62.
No. 3: J. J. Hugenroth, U.S. Pat. No. 6,367,281.

SUMMARY OF THE INVENTION

Accordingly, the present invention is directed to a thermoelastic cooling system that substantially obviates one or more of the problems due to limitations and disadvantages of the related art.

To achieve these and other advantages and in accordance with the purpose of the present invention, as embodied and broadly described, in one aspect, the present invention provides a cooling system, comprising: a pair of rollers driven by a motor, the pair of rollers facing each other with a prescribed gap therebetween; a looped solid refrigerant belt that is sandwiched by the pair of rollers at the prescribed gap in such a stressed and compressed state that a portion of the solid refrigerant belt that comes out from the gap between the rollers transits to a colder thermodynamic state; and a cold reservoir containing a cooling medium, continuously receiving the portion of the solid refrigerant belt that comes out from the gap between the rollers so as to cool the cooling medium by said portion of the solid refrigerant belt, wherein the pair of rollers also receive heat from the solid refrigerant belt when the solid refrigerant belt is at the gap so as to act as a heat sink that is directly contacting the solid refrigerant belt, and wherein the solid refrigerant belt is made of a material capable of exhibiting thermoelastic effect.

Here, the solid refrigerant belt may release heat to the pair of rollers as the heat sink when the solid refrigerant belt is at the gap and in thermal contact with the heat sink while the solid refrigerant is being stressed, and the solid refrigerant may absorb heat from the cooling medium in the cold reservoir when the solid refrigerant belt is in thermal contact with the cooling medium in the cold reservoir while said portion of the solid refrigerant belt is being relaxed from the stressed and compressed state.

The solid refrigerant belt may be made of a unitary and continuous thermoelastic member.

The thermoelastic member may be made of one of, or a composite of two or more of, Nickel Titanium alloys, Copper Aluminum Nickel, Copper Zinc Nickel, Iron Palladium, Gold Cadium, Nickel Manganese Gallium, or any derivative alloys thereof.

The solid refrigerant belt may be made of a series of discrete blocks that are thermally disconnected from each other and connected through a connecting member that mechanically connects thermally disconnected individual blocks in a loop.

The refrigerant belt may include a composite of polymers that exhibit reversible transition that is associated with absorbing or releasing heat.

The material of thermoelastic refrigerant may require stress to induce reversible a solid to solid phase transition; the heat associated with the transition may be greater than 1 J/g; and the temperature at which the material completely transforms to a final high temperature phase without an aid of any external energy may be equal or lower than a prescribed target temperature.

The gap that separates the pair of rollers may have a gap dimension that is less than 97% of a thickness of the refrigerant belt so that as the solid refrigerant belt is fed into the gap, the belt is compressed at a strain of 3% or greater.

Each of the roller may have a groove to guide and accommodate the solid refrigerant belt so as to create a bigger contact area with the solid refrigerant belt.

Each of the roller may have heat discharging fins on side surfaces thereof for heat exchange between the roller and an ambient environment.

The cold reservoir may include an inlet and an outlet for the cooling medium such that the cooling medium flows in a direction opposite to a direction in which the solid refrigerant belt generally moves inside the cold reservoir.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory, and are intended to provide further explanation of the invention as claimed.

DETAILED DESCRIPTION OF THE INVENTION AND THE PREFERRED EMBODIMENTS

Achieving efficient heat exchange is the key challenge for commercializing the thermoelastic cooling technology because of the following constraints: 1) heat exchange coefficient between the refrigerant and the heat-exchange medium is low, 2) solid refrigerant is mechanically compressed and released periodically, and the heat exchange must be in synchronization with the periodical application of stress, 3) compressive stress is preferred over tensile and torsional stress due to fatigue life concern, 4) solid refrigerant must maintain certain geometric aspect ratio to avoid buckling under compression, 5) higher system operation frequency is preferred for higher system power density. An innovative system design that can balance the above-mentioned constraints is needed to achieve a compact, efficient, and cost-effective thermoelastic cooling system.

Figure 1:
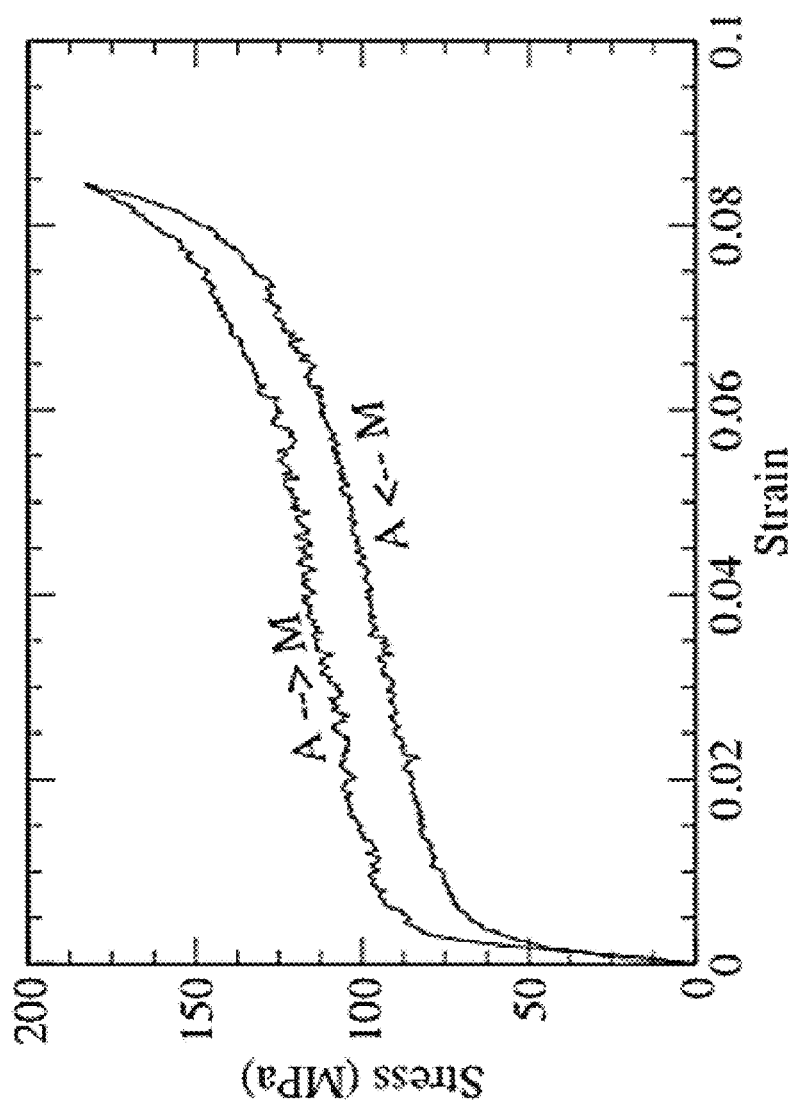
FIG. 1 is a graphical representation of stress-strain relations in a Cu—Al—Ni alloy.
Figure 2:
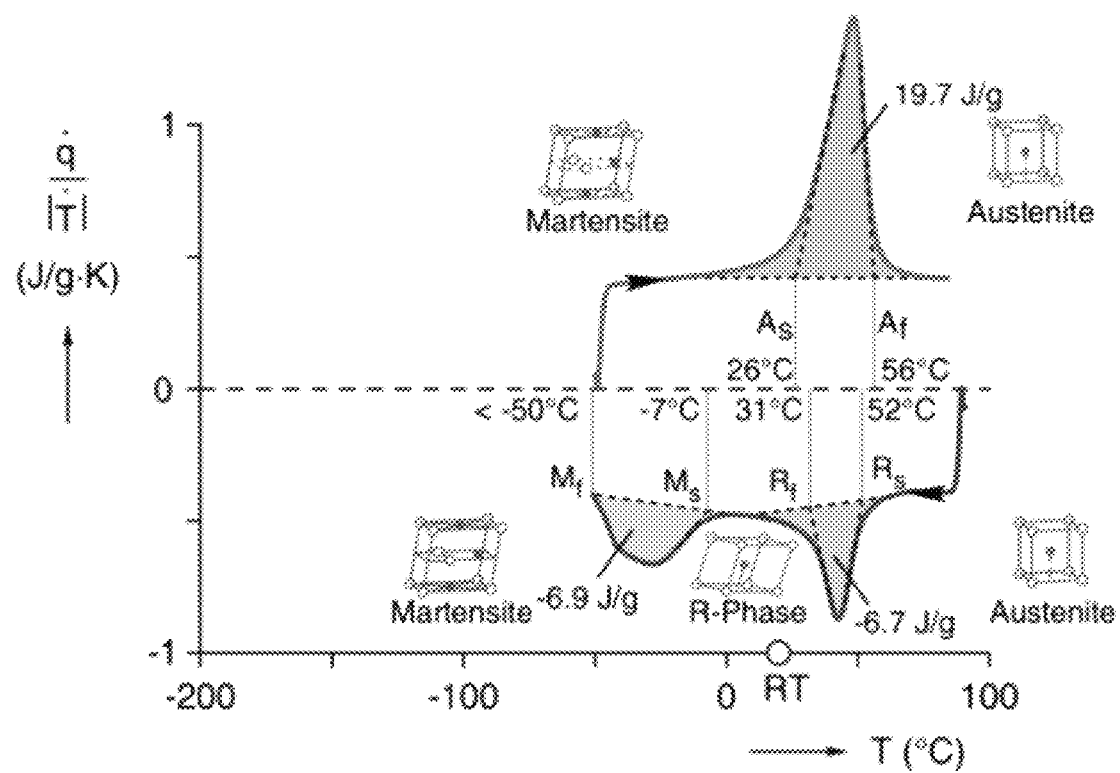
FIG. 2 is a graphical representation of the DSC curves of a NiTi alloy.
Figure 3:
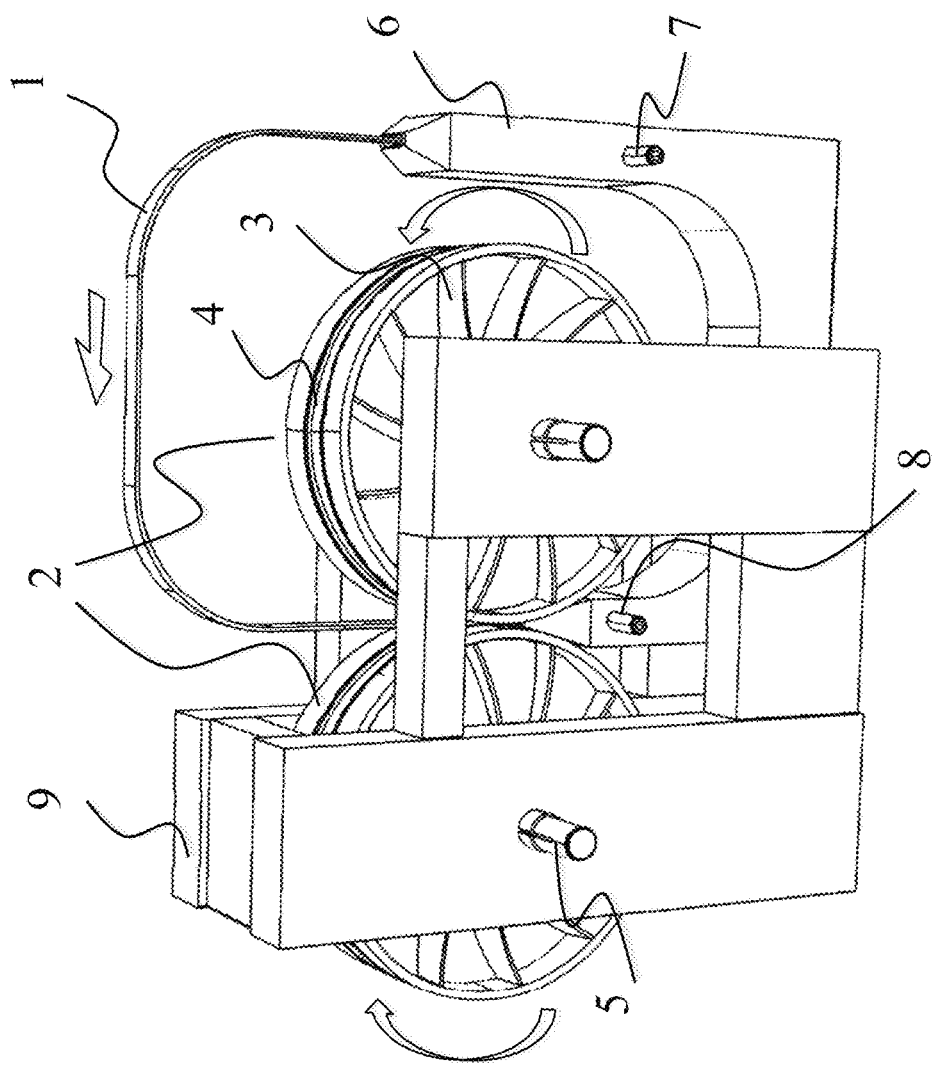
FIG. 3 is a schematic of a compact thermoelastic cooling system according to an embodiment of the present invention.

The present invention, in one aspect, discloses a compact thermoelastic cooling system that includes a set of rollers, a refrigerant belt made of thermoelastic material, and a cold reservoir containing a heat exchange medium. An embodiment of this system is depicted in FIG. 3.

A pair of rollers 2 is driven by a motor through the shaft 5. The rollers 2 catch and compress a portion of a solid refrigerant belt 1. A belt 1 is inserted into a cold reservoir 6, which is an enclosure for a cooling medium that has an inlet 7 and an outlet 8 for the cooling medium. A system frame 9 is provided to support the shafts 5 and the cold reservoir 6. Each roller 2 has a groove 4 to grab and guide the solid refrigerant belt 1, and is equipped with fin blades 3 on die surfaces of the roller for heat discharge.

With the rotating motion of the rollers, the compressed portion of the refrigerant belt is then released and moved forward. The gap between the rollers is less than the thickness of the refrigerant belt (<97%, for example) so that the belt is compressed when it passes through the rollers such that the refrigerant materials can undergo stress induced phase transformation.

The rollers 2 of the present embodiment have three functions: applying compressive stress to the refrigerant, driving the refrigerant belt forward, and serving as heat sink by absorbing heat generated by the refrigerant belt 1 under compression and dumping the heat to the ambient atmosphere. Because of the large compressive stress, the roller 2 and the refrigerant belt 1 are in intimate contact. The heat transfer between these two intimately contacted metal surfaces is fast enough for the majority of the generated heat to be transferred to the roller if the rolling speed is adequately controlled and not too fast. The roller has high hardness for applying stress and high thermal conductivity for transferring heat.

In this embodiment, the roller has curved fin feature 3 on the side surface to maximize its heat exchange with the ambient atmosphere. The roller surface is grooved (the groove 4) to ensure the refrigerant belt is properly aligned with the roller and to increase the thermal contact area between the rollers 2 and the refrigerant belt 1.

Lubricant coating such Boron Nitride can be applied to the roller to minimize the friction force and to improve heat exchange efficient.

The cold reservoir 6 of the present embodiment contains heat an exchange medium (a cooling medium) such as air or water, and engulfs the cold part of the refrigerant. The cooling medium flows into the cold reservoir 6 through the inlet 7 and flows out to a target space (i.e., the target to be cooled) through the outlet 8, countering against the belt moving direction. The cold reservoir 6 has sufficiently small opening or similar mechanism to limit or prevent water from running out. The various parts of the embodiment of the present invention, as described above, can be constructed from any suitable materials having adequate physical properties/characteristics, such as materials having sufficiently large mechanical strengths and adequate thermal conductivities, etc.

Figure 4:
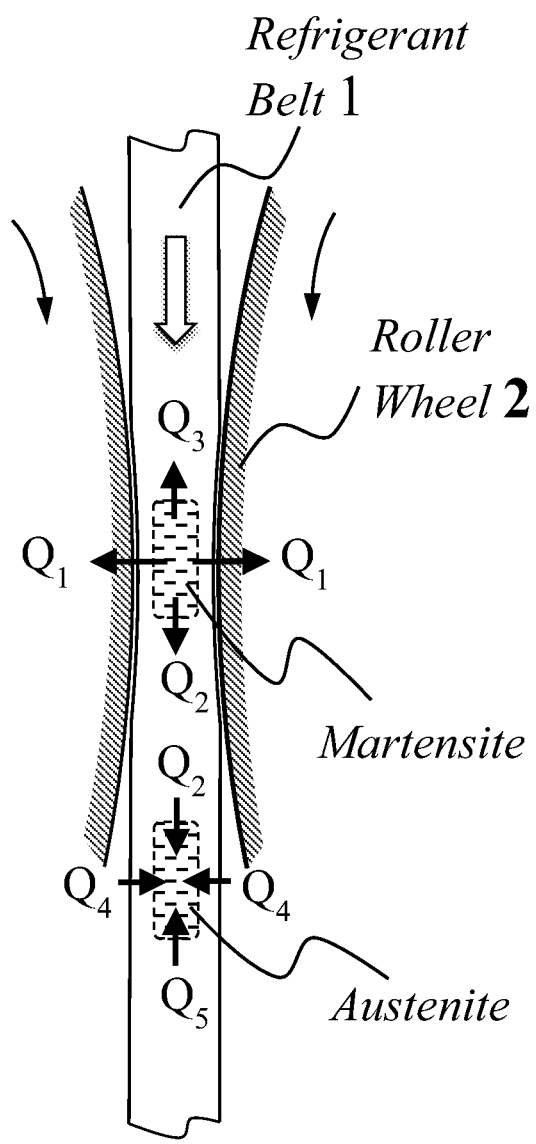
FIG. 4 schematically illustrates the process and heat flows when a refrigerant belt passes through the gap between a pair of the rollers of the embodiment depicted in FIG. 3.

FIG. 4 schematically illustrates the process and heat flows when the refrigerant belt 1 passes through the gap between a pair of the rollers 2 of the embodiment depicted in FIG. 3. When the refrigerant belt 1 passes through the rollers 2, a portion of the refrigerant belt 1 is compressed and transformed to martensite. Latent heat is generated and subsequently dissipated into the neighboring objects. A part of the generated heat $Q_1$ transfers to the two rollers that are in contact with the transformed materials. As shown in FIG. 4, the rest of the heat transfers within the refrigerant belt: one part $Q_2$ travels along the belt moving direction, and one part $Q_3$ travels against the belt moving direction.

Figure 5:
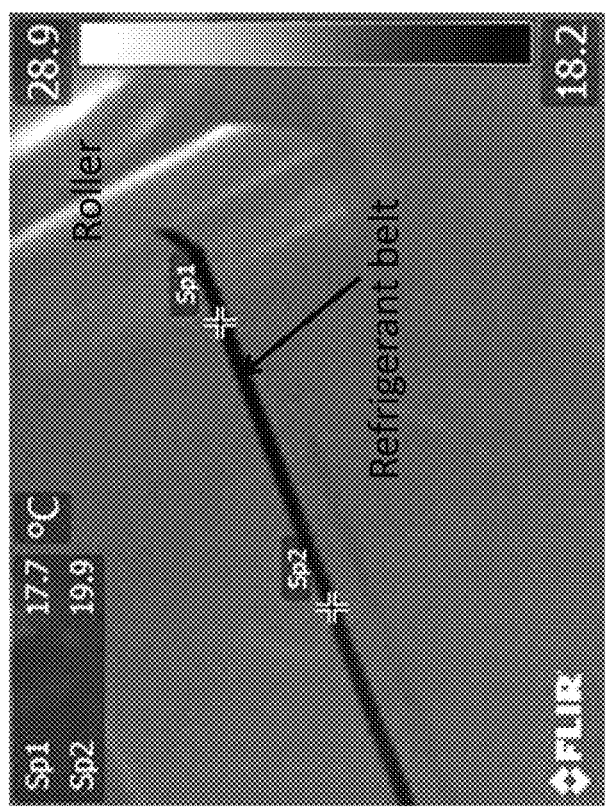
FIG. 5 is a thermal image of the refrigerant belt coming out of the compression by a pair of rollers according to the embodiment depicted in FIG. 3.

As the refrigerant belt 1 moving forward, the portion of the belt that was under compression is now released from compression. It starts to transforms back to austenite and absorbs latent heat from the surrounding atmosphere $Q_4$ and from neighboring materials $Q_2$ and $Q_5$. Since only a part of the previously generated heat $Q_2$ transfers in the forward direction, the net heat absorbed $Q_4+Q_5$ is equivalent to $Q_1+Q_3$. As shown in FIG. 4, because of the net heat absorption, the part of the refrigerant belt immediately coming out of the roller is cold. Similarly, because the net heat accumulation, the part of the refrigerant belt that is about to be fed into the roller is hot. FIG. 5 shows the result of a confirming experiment; that is, a thermal image of a refrigerant belt coming out of the compression by a pair of rollers. It shows a spot on the roller (Sp#1) is colder than roller or the other spot (Sp#2) that is farther away from the roller. This confirm the above-mentioned principle of the operation.

Although the refrigerant belt 1 is physically connected, the thermal conductivity of the belt 1 varies. The part that is under compression by the two rollers is in martensite state. For NiTi, the thermal conductivity of martensite is 86 W/m-K; the parts of the belt that are coming in and coming out of the roller are both stress-free and are in austenite state. The thermal conductivity of austenite NiTi is 180 W/m-K. Because of the lower thermal conductivity of the section that separates the hot and the cold sections of the refrigerant belt, the temperature gradient is sufficiently maintained.

A refrigerant belt made of a continuous thermoelastic material, as described above, has the advantage of being capable of constructing simple systems, but its maximum temperature lift ($\Delta T$) is somewhat limited because of the heat dissipation from the transforming neighbor materials. In another embodiment, a refrigerant belt made of discrete thermoelastic materials may be used. This allows pulse operation, which may maximize heat exchange between the rollers and the refrigerant by prolonging the duration of the compression. Once the heat generated by compressing the refrigerant into martensite is mostly transferred to the rollers, the refrigerant reaches the lowest temperature when in martensite state. This lowest temperature enables the refrigerant to exhibit maximum temperature lift. However, a discrete refrigerant belt implies engineering complexity, lower system reliability, and higher cost. Thus, a design choice can be made by balancing the cons and pros of both types of the belt.

Embodiments of the present invention, as described above, address the need of new cooling technology that is affordable, highly efficient, and environmental friendly. For example, in one aspect, the present invention can be applied to construct a relatively compact thermoelastic cooling system using a set of rollers to continuously apply compressive stress to the solid refrigerant belt and extract heat from the solid refrigerant belt, as shown in FIG. 3.

The refrigerant belt 1 may have rectangular, circular, or elliptical cross-section. Further, the refrigerant belt may loop around the roller more than one turn in some embodiments.

In the embodiments, as described above, the part of the refrigerant belt just released from the compression of the rollers is cold while the part that is about to be compressed by the rollers is hot. The hot part of the refrigerant belt and the rollers exchange heat with ambient air; while the cold part of the refrigerant belt exchange heat with the medium in the cold reservoir. The medium may be water or other environmental friendly heat exchange medium.

Figure 6:
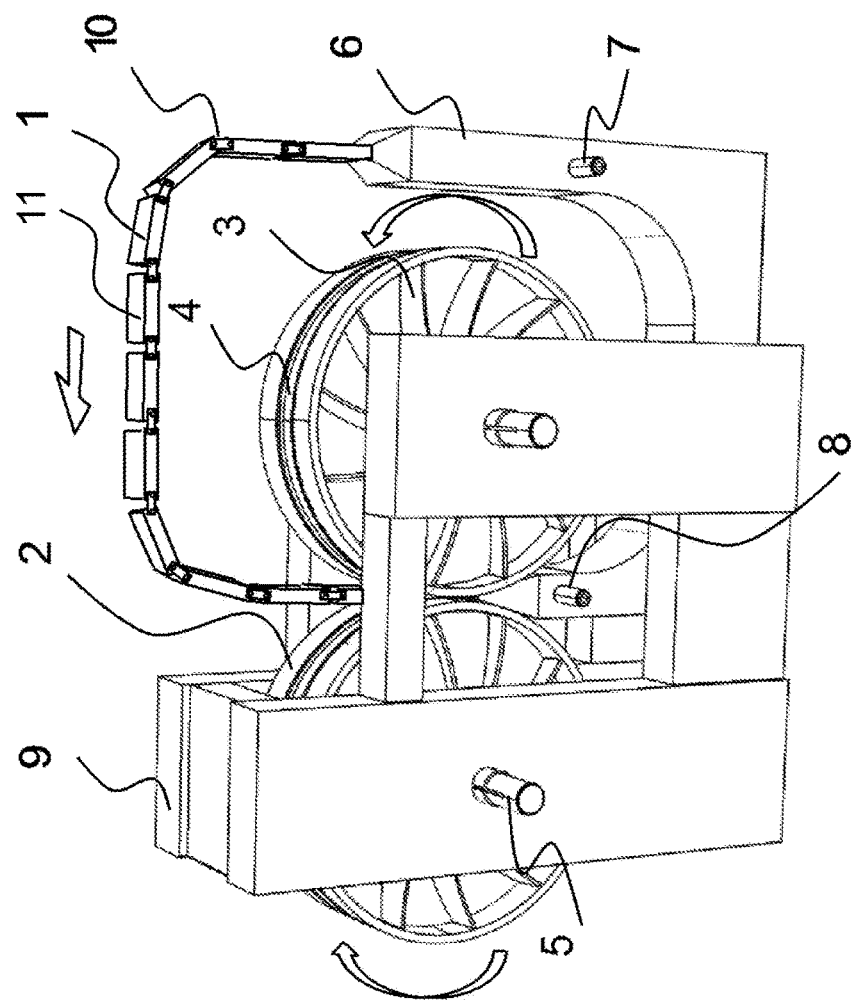
FIG. 6 is a schematic of a compact thermoeleastic cooling system with details of the refrigerant belt according to an embodiment of the present invention.

In the present embodiment, as shown in FIG. 6, the refrigerant belt 1 may be constructed of a series of blocks 11 of thermoelastic materials. The blocks 11 are linked through a certain mechanical member, such as a connecting member 10, allowing forward driving motion of the whole belt, but maintaining individual thermal characteristics during the phase transformation.

Another embodiment of the invention is a thermoelastic cooling system for dehumidification (i.e., a dehumidifier). The cold part of the refrigerant belt has a temperature below dew point and its cold surface is in contact with ambient air. Water condenses on the cold surface and collected by the rollers during compression.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A cooling system, comprising:
   a pair of rollers driven by a motor, the pair of rollers facing each other with a prescribed gap therebetween;
   a looped solid refrigerant belt that is sandwiched by the pair of rollers at the prescribed gap in such a stressed and compressed state that a portion of the solid refrigerant belt that comes out from the gap between the rollers transits to a colder thermodynamic state; and
   a cold reservoir containing a cooling medium, continuously receiving the portion of the solid refrigerant belt that comes out from the gap between the rollers so as to cool the cooling medium by said portion of the solid refrigerant belt,
   wherein the pair of rollers also receive heat from the solid refrigerant belt when the solid refrigerant belt is at the gap so as to act as a heat sink that is directly contacting the solid refrigerant belt, and
   wherein the solid refrigerant belt is made of a material capable of exhibiting thermoelastic effect.

2. The system according to claim 1, wherein the solid refrigerant belt releases heat to the pair of rollers as the heat sink when the solid refrigerant belt is at the gap and in thermal contact with the heat sink while the solid refrigerant is being stressed, and the solid refrigerant absorbs heat from the cooling medium in the cold reservoir when the solid refrigerant belt is in thermal contact with the cooling medium in the cold reservoir while said portion of the solid refrigerant belt is being relaxed from the stressed and compressed state.

3. The system according to claim 1, wherein the solid refrigerant belt is made of a unitary and continuous thermoelastic member.

4. The system according to claim 3, wherein the thermoelastic member is made of one of, or a composite of two or more of, Nickel Titanium alloys, Copper Aluminum Nickel, Copper Zinc Nickel, Iron Palladium, Gold Cadium, Nickel Manganese Gallium, or any derivative alloys thereof.

5. The system according to claim 1, wherein the solid refrigerant belt is made of a series of discrete blocks that are thermally disconnected from each other and connected through a connecting member that mechanically connects thermally disconnected individual blocks in a loop.

6. The system according to claim 1, wherein the refrigerant belt includes a composite of polymers that exhibit reversible transition that is associated with absorbing or releasing heat.

7. The system according to claim 1, wherein:
   the material of thermoelastic refrigerant requires stress to induce reversible a solid to solid phase transition;
   the heat associated with the transition is greater than 1 J/g; and
   the temperature at which the material completely transforms to a final high temperature phase without an aid of any external energy is equal or lower than a prescribed target temperature.

8. The system according to claim 3, wherein each of the roller has heat discharging fins on side surfaces thereof for heat exchange between the roller and an ambient environment.

9. The system according to claim 1, wherein the cold reservoir includes an inlet and an outlet for the cooling medium such that the cooling medium flows in a direction opposite to a direction in which the solid refrigerant belt generally moves inside the cold reservoir.

10. A cooling system, comprising:
    a pair of rollers driven by a motor, the pair of rollers facing each other with a prescribed gap therebetween;
    a looped solid refrigerant belt that is sandwiched by the pair of rollers at the prescribed gap in such a stressed and compressed state that a portion of the solid refrigerant belt that comes out from the gap between the rollers transits to a colder thermodynamic state; and
    a cold reservoir containing a cooling medium, continuously receiving the portion of the solid refrigerant belt that comes out from the gap between the rollers so as to cool the cooling medium by said portion of the solid refrigerant belt,
    wherein the pair of rollers also receive heat from the solid refrigerant belt when the solid refrigerant belt is at the gap so as to act as a heat sink that is directly contacting the solid refrigerant belt,
    wherein the solid refrigerant belt is made of a material capable of exhibiting thermoelastic effect, and
    wherein the gap that separates the pair of rollers has a gap dimension that is less than 97% of a thickness of the refrigerant belt so that as the solid refrigerant belt is fed into the gap, the belt is compressed at a strain of 3% or greater.

11. The system according to claim 10, wherein the solid refrigerant belt releases heat to the pair of rollers as the heat sink when the solid refrigerant belt is at the gap and in thermal contact with the heat sink while the solid refrigerant is being stressed, and the solid refrigerant absorbs heat from the cooling medium in the cold reservoir when the solid refrigerant belt is in thermal contact with the cooling medium in the cold reservoir while said portion of the solid refrigerant belt is being relaxed from the stressed and compressed state.

12. The system according to claim 10, wherein the solid refrigerant belt is made of a unitary and continuous thermoelastic member.

13. The system according to claim 12, wherein the thermoelastic member is made of one of, or a composite of two or more of, Nickel Titanium alloys, Copper Aluminum Nickel, Copper Zinc Nickel, Iron Palladium, Gold Cadium, Nickel Manganese Gallium, or any derivative alloys thereof.

14. The system according to claim 10, wherein the solid refrigerant belt is made of a series of discrete blocks that are thermally disconnected from each other and connected through a connecting member that mechanically connects thermally disconnected individual blocks in a loop.

15. The system according to claim 10, wherein the cold reservoir includes an inlet and an outlet for the cooling medium such that the cooling medium flows in a direction opposite to a direction in which the solid refrigerant belt generally moves inside the cold reservoir.

16. A cooling system, comprising:
a pair of rollers driven by a motor, the pair of rollers facing each other with a prescribed gap therebetween;
a looped solid refrigerant belt that is sandwiched by the pair of rollers at the prescribed gap in such a stressed and compressed state that a portion of the solid refrigerant belt that comes out from the gap between the rollers transits to a colder thermodynamic state; and
a cold reservoir containing a cooling medium, continuously receiving the portion of the solid refrigerant belt that comes out from the gap between the rollers so as to cool the cooling medium by said portion of the solid refrigerant belt,
wherein the pair of rollers also receive heat from the solid refrigerant belt when the solid refrigerant belt is at the gap so as to act as a heat sink that is directly contacting the solid refrigerant belt,
wherein the solid refrigerant belt is made of a material capable of exhibiting thermoelastic effect,
wherein the solid refrigerant belt is made of a unitary and continuous thermoelastic member, and
wherein each of the roller has a groove to guide and accommodate the solid refrigerant belt so as to create a bigger contact area with the solid refrigerant belt.

17. The system according to claim 16, wherein the solid refrigerant belt releases heat to the pair of rollers as the heat sink when the solid refrigerant belt is at the gap and in thermal contact with the heat sink while the solid refrigerant is being stressed, and the solid refrigerant absorbs heat from the cooling medium in the cold reservoir when the solid refrigerant belt is in thermal contact with the cooling medium in the cold reservoir while said portion of the solid refrigerant belt is being relaxed from the stressed and compressed state.

18. The system according to claim 16, wherein the thermoelastic member is made of one of, or a composite of two or more of, Nickel Titanium alloys, Copper Aluminum Nickel, Copper Zinc Nickel, Iron Palladium, Gold Cadium, Nickel Manganese Gallium, or any derivative alloys thereof.

19. The system according to claim 16 wherein each of the roller has heat discharging fins on side surfaces thereof for heat exchange between the roller and an ambient environment.

20. The system according to claim 16, wherein the cold reservoir includes an inlet and an outlet for the cooling medium such that the cooling medium flows in a direction opposite to a direction in which the solid refrigerant belt generally moves inside the cold reservoir.

* * * * *